US010373197B2

(12) United States Patent
Jordon et al.

(10) Patent No.: US 10,373,197 B2
(45) Date of Patent: Aug. 6, 2019

(54) TUNABLE ALGORITHMIC SEGMENTS

(71) Applicant: Adobe Inc., San Jose, CA (US)

(72) Inventors: Nicholas M. Jordon, Brooklyn, NY (US); Margarita R. Savova, Jersey City, NJ (US); Matvey Kapilevich, New York, NY (US); Paul Mackles, Lawrenceville, NJ (US); David M. Weinstein, Rockville Centre, NY (US)

(73) Assignee: Adobe Inc., San Jose, CA (US)

( * ) Notice: Subject to any disclaimer, the term of this patent is extended or adjusted under 35 U.S.C. 154(b) by 1233 days.

(21) Appl. No.: 13/726,308

(22) Filed: Dec. 24, 2012

(65) Prior Publication Data
US 2014/0180804 A1 Jun. 26, 2014

(51) Int. Cl.
*G06Q 30/02* (2012.01)
(52) U.S. Cl.
CPC ................ *G06Q 30/0254* (2013.01)
(58) Field of Classification Search
CPC .................. G06Q 30/00; G06Q 30/0284
USPC .............................................. 705/14.1, 14.73
See application file for complete search history.

(56) References Cited

U.S. PATENT DOCUMENTS

| 8,448,057 B1* | 5/2013 | Sugnet | G06Q 30/02 |
| | | | 715/204 |
| 9,208,510 B1* | 12/2015 | Bonalle | G06Q 30/02 |
| 2009/0099920 A1* | 4/2009 | Aharoni | G06Q 30/02 |
| | | | 705/14.26 |
| 2010/0228595 A1* | 9/2010 | Dempster | G06Q 30/02 |
| | | | 705/14.53 |

* cited by examiner

*Primary Examiner* — John Van Bramer
(74) *Attorney, Agent, or Firm* — SBMC

(57) ABSTRACT

Tunable algorithmic segment techniques are described. In one or more implementations, a target audience definition is obtained that is input to initiate creation of a look-alike model. The target audience definition indicates traits associated with a baseline group of consumers who have interacted with online resources in a designated manner, such as by buying a product, visiting a website, using a service, and so forth. Tuning parameters designated for the look-alike model are ascertained and the look-alike model is built based on the target audience definition and the tuning parameters. The tuning parameters may include at least a setting selectable to control reach versus accuracy for the look-alike model. Segment data indicative of market segments generated according to the look-alike model may then be exposed for manipulation by a client. The manipulation may include selectable control over the tuning parameters to generate different look-alike groups from the segment data.

19 Claims, 10 Drawing Sheets

TUNABLE ALGORITHMIC SEGMENTS

BACKGROUND

As consumer interaction with online resources (e.g., use of web services, e-commerce, browsing activity, etc.) has grown digital marketing too has becoming increasingly more common. Generally, digital marketers seek to deliver offers for products, services, and content to consumer audiences who will find the offers favorable and have high probability of responding to the offers. One challenge faced by digital marketers is finding "look-alike" groups that have traits comparable to known traits of existing target audiences so as to facilitate expansion of existing marketing campaigns to the look-alike groups.

Traditionally, demographic and behavioral data (e.g., audience data) may be collected and analyzed to model known target groups and identify potential new look-alike consumers. Due in part to the amount of audience data available for online consumers, though, the look-alike analysis may be complex and time consuming. As, such timely and effective manual analysis may be impractical. Moreover, digital marketers are traditionally provided little or no control over automated tools that purport to provide look-alike analysis. Rather, existing analysis tools are black-box solutions that output fixed audience segments without opportunity for digital marketers to adjust the analysis based on their intuition and experience. Accordingly, adequate mechanisms do not currently exist to identify and target offers to look-alike consumers that have characteristics similar to a known group.

SUMMARY

Tunable algorithmic segment techniques are described. In one or more implementations, a target audience definition is obtained that is input to initiate creation of a look-alike model. The target audience definition indicates traits associated with a baseline segment of consumers who have interacted with online resources in a designated manner, such as by buying a product, visiting a website, using a service, and so forth. Tuning parameters designated for the look-alike model are ascertained and the look-alike model is built based on the target audience definition and the tuning parameters. The tuning parameters may include at least a setting selectable to control reach versus accuracy for the look-alike model. Segment data indicative of market segments generated according to the look-alike model may then be exposed for manipulation by a client. The manipulation may include selectable control over the tuning parameters to generate different look-alike groups from the segment data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Tunable algorithmic segment techniques are described. In one or more implementations, a target audience definition is obtained that is input to initiate creation of a look-alike model. The target audience definition indicates traits associated with a baseline group of consumers who have interacted with online resources in a designated manner, such as by buying a product, visiting a website, using a service, and so forth. Tuning parameters designated for the look-alike model are ascertained and the look-alike model is built based on the target audience definition and the tuning parameters. The tuning parameters may include at least a setting selectable to control reach versus accuracy for the look-alike model. Segment data indicative of market segments generated according to the look-alike model may then be exposed for manipulation by a client. The manipulation may include selectable control over the tuning parameters to generate different look-alike groups from the segment data.

In the following discussion, an example environment is first described that may implement the techniques described herein. Example details regarding tunable algorithmic segments techniques are then discussed. This discussion of example details includes separate sub-sections for example procedures, segmentation algorithms, and example user interfaces. Lastly, an example system and components of the system are discussed that may be employed to implement various techniques described herein.

Example Environment

Figure 1:
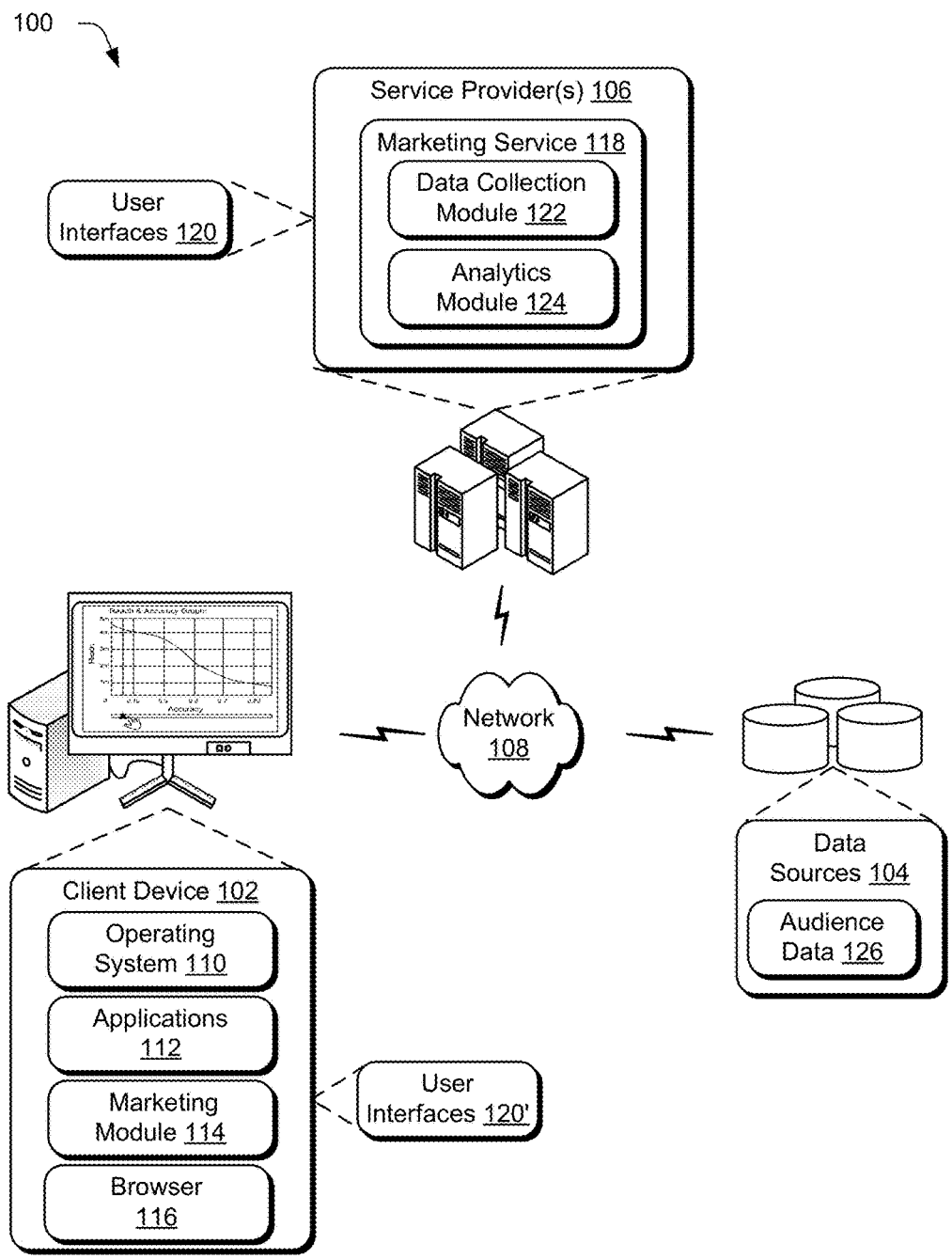
FIG. 1 is an illustration of an example operating environment that is operable to employ techniques for tunable algorithmic segments.

FIG. 1 is an illustration of an environment 100 in an example implementation that is operable to employ techniques described herein. The illustrated environment 100 includes a client device 102, one or more data sources 104, and a service provider 106 that are communicatively coupled via a network 108. The client device 102, data sources 104, and service provider 106 may each be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 10.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a document reader, a multi-media player, image editing software, a productivity suite that integrates multiple office productivity modules, games, and so forth. As specific example of applications 112, the client device 102 is also illustrated as including a marketing module 114 and a browser 116.

The marketing module 114 may be configured in various ways to implement client side aspects of techniques for tunable algorithmic segments described herein. As illustrated, the marketing module 114 may be provided as a standalone application that may enable digital marketers to manage marketing campaigns, audience data, market segments, and so forth. In general, this includes audience data collection, analysis of audience data to ascertain market segments of consumers having selected traits, creation of offers for products, services, and/or content, and distribution of the offers. The marketing module 114 may facilitate interaction with a marketing service 118 provided by the service provider 106 over the network. Thus, the marketing module 114 may represent a thin client web-based application or a web-enabled desktop application through which a digital marketer may access a marketing account with the marketing service 118 and interact with corresponding data. In addition or alternatively, the techniques described herein may be implemented by way of the browser 116, which may be configured to access the marketing service 118 over the network 108.

As noted, the service provider 106 may provide a marketing service 118 as depicted in FIG. 1. The marketing service 118 is representative of an integrated digital marketing platform configured to provide a suite of digital marketing tools including but not limited to consumer data collection and analytics, social media management, digital advertising, audience targeting, and/or web experience management, to name a few examples. The marketing service 118 also enables generation of tunable algorithmic segments as described herein. Various digital marketing tools may be made accessible via webpages or other user interfaces 120 that may be accessed and rendered by a client device 102 as corresponding user interfaces 120'. Some example user interfaces to implement aspects of the techniques for tunable algorithmic segments described herein are discussed below in relation to FIGS. 5-9. The marketing service 118 may be implemented in the "cloud" as a service accessible over the network as illustrated, by one or more distributed components in a client-server environment, as a locally deployed enterprise platform, and/or in another suitable manner.

In accordance with tunable algorithmic segment techniques described above and below, the marketing service 118 may include or otherwise make use of a data collection module 122 and an analytics module 124 that are configured to obtain and manipulate audience data 126 from the data sources 104. In particular, the data collection module 122 represents functionality operable to collect, access, and/or make use of audience data 126 regarding consumer traits including characteristics (e.g., age, sex, location, affiliations, etc.) and behaviors (e.g., browsing habits, favorites, purchase history, preferences, account activity, etc.) from the various data sources 104. The data sources may include first party databases of a particular marketer, data collected by the service provider 106, and/or third-party data services provided by other entities. The data collection module 122 may collect and store audience data 126 on behalf of digital marketers. For example, audience data 126 may be collected based on visitors to a company website, through online surveys, as part of e-commerce transactions, based on account sign-ups, and so forth.

The analytics module 124 represents functionality operable to perform various analysis of audience data 126 to assist digital marketers in making marketing decisions, creating and managing campaigns, generating reports, delivering ads/offers, and so forth. By way of example and not limitation, the analytics module 124 includes functionality to perform look-alike analysis as described above and below.

Generally speaking, look-alike analysis is performed to find individuals within a general audience (as described by audience data 126 from selected sources) that match traits of a known, baseline group of individuals that may have behaved in a designated manner and/or have selected traits. Here, the known group is considered the target audience segment for a particular marketing campaign, and the look-alike analysis seeks to discover individuals to which the marketing campaign may be expanded with a high probability of success. Typically, the known group has engaged in some prior activities in relation to the marketer seeking to expand the campaign. In other words, a target audience segment that possesses known traits is used to analyze audience data 126 and find a matching, look-alike segment of the general audience that shares at least some of the known behaviors and traits. The identified look-alike segment that is generated may include a list of individual user identities for members of the general audience that match the target segment based on the analysis. In one approach, the individual user identities are provided anonymously to the digital marketer to protect privacy rights. However, the information regarding the look-alike segment is sufficient to enable the digital marketer to deliver offers for products, services, and/or content to the identified individuals through the marketing service or otherwise.

Figure 2:
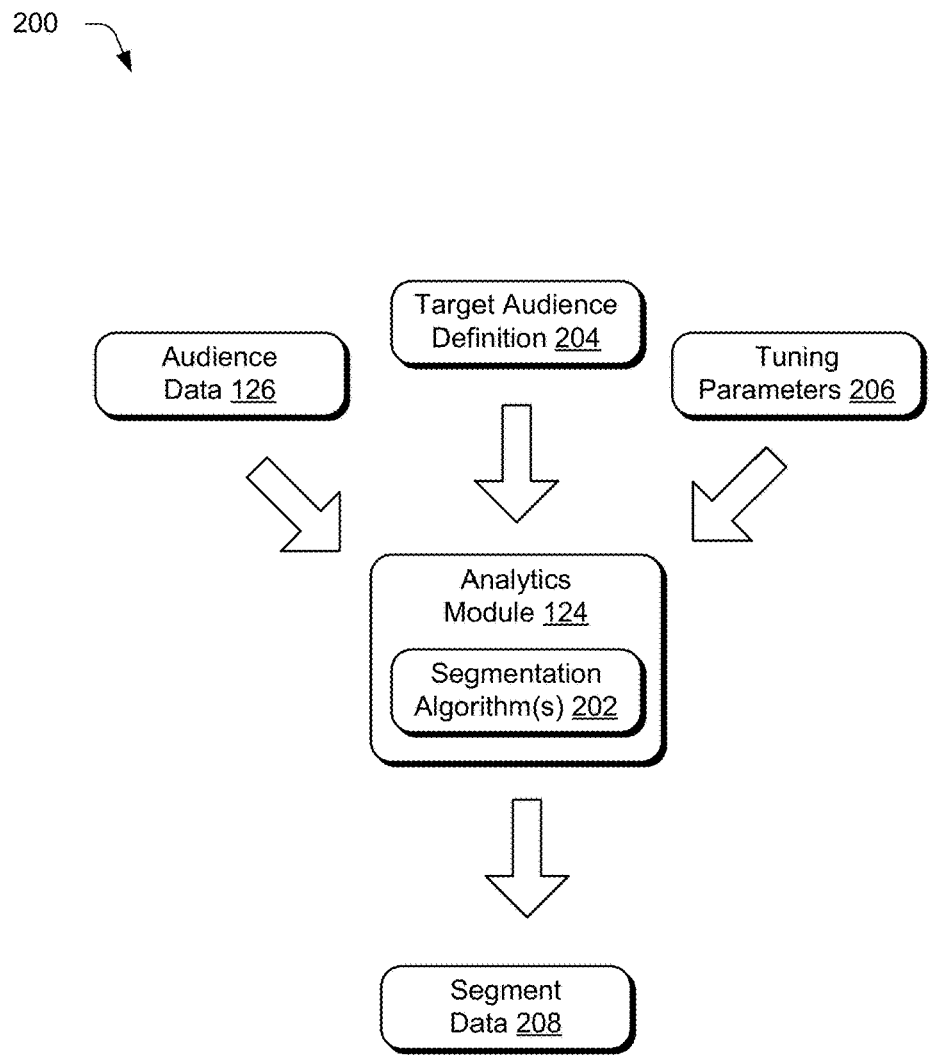
FIG. 2 is a diagram depicting some example scenarios for producing segments in one or more implementations.

To further illustrate, consider now FIG. 2 which depicts generally at 200 a diagram that represents an example process for look-alike analysis in accordance with the described techniques. In particular, the analytics module 124 in this example includes or makes use of one or more segmentation algorithms 202 that may be applied to identify look-alike segments from suitable inputs. In this example, the inputs include audience data 126, a target audience definition 204, and tuning parameters 206. A selected segmentation algorithm 202 may be applied to these inputs to produce segment data 208 as shown in FIG. 2. Here, the segment data 208 may encompass one or more segments (e.g., groupings of users having common traits) generated through the analysis as well as underlying data, weights, parameters, and scores used to produce the segments. Providing both the segments and the underlying information provides transparency to the analysis and enables subsequent tuning by the digital marketer as described herein. Some details regarding example segmentations algorithms 202 are described in a section below entitled "Segmentation Algorithms."

The audience data 126 may include data from one or more data sources 104 as previously mentioned. In an implementation, a digital marketer may be given an option to select from among multiple available data sources. The target audience definition 204 is configured to indicate the traits of the known group selected to provide a baseline for the look-alike analysis. For instance, the marketing service 118 may provide user interfaces 120 through which a digital marketer may select an existing segment and/or particular traits to create a target audience definition 204. The target audience definition is then used as a basis for discovering a matching segment of individuals having similar characteristics and behaviors (e.g., a look-alike segment) from the audience data 126.

The analytics module 124 may also be configured to employ tuning parameters 206. The tuning parameters 206 enable a digital marketer to exert control over the output of the analysis and form different look-alike segments in different scenarios and/or to achieve different goals. Thus, the automated power of algorithmic-based analysis may be supplemented through various tuning parameters 206 with the intuition and experience of the digital marketer. The result is timely (e.g., relatively fast computation) and effective look-alike analysis that combines a segmentation algorithm 202 with user configurable tuning parameters 206. This is in contrast to traditional black-box solutions which merely return static results without an opportunity for tuning.

The tuning parameters 206 may include at least a setting selectable to control reach versus accuracy for the look-alike model. Reach is a measure of how many individual user identities for members of the general audience are included in the segments generated. Accuracy (also referred to as similarity) is a measure of how closely individuals included in a segment match the target segment. Generally, reach (e.g., the number of matching individuals) decreases as accuracy (e.g., closeness of the match) increases. Thus, tuning parameters may include one or more reach-accuracy parameters that enable a digital marketer to specify a particular reach goal or accuracy goal and/or to select values that provide an acceptable balance between reach and accuracy. The tuning parameters 206 may also include other factors including but not limited to weighting factors to control the contribution of particular traits, a time period indicative of an interval for processing audience data, data source selections, weights to control the contribution of different data sources, addition of customized traits, removal of selected traits, segmentation algorithm selections, model run frequency (e.g., daily, weekly, monthly, etc.) and so forth. Details regarding these and other aspects of techniques for tunable algorithmic segments are discussed in relation to the following figures.

Having considered an example environment, consider now a discussion of some example tunable algorithmic segment details in accordance with one or more implementations.

Tunable Algorithmic Segment Details

This section describes details regarding tunable algorithmic segments in accordance with one or more implementations. As mentioned, a marketing service 118 may be implemented to provide look-alike analysis that combines automated segmentation algorithms with user configurable tuning to generate look-alike segments in a timely and effective manner. In the discussion that follows, example procedures are first discussed followed by a description of some example segmentation algorithms. Example user interfaces that may be employed to implement aspects of the techniques for tunable algorithmic segments are discussed thereafter.

Example Procedures

The following discussion describes example procedures that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the diagram 200 of FIG. 2. In at least some embodiments, the procedures may be performed by a suitably configured computing device(s), such one or more server devices associated with the service provider 106 that implement a marketing service 118 and/or a client device 102 of FIG. 1 that includes a suitable marketing module 114 or browser 116 to implement the described techniques.

Figure 3:
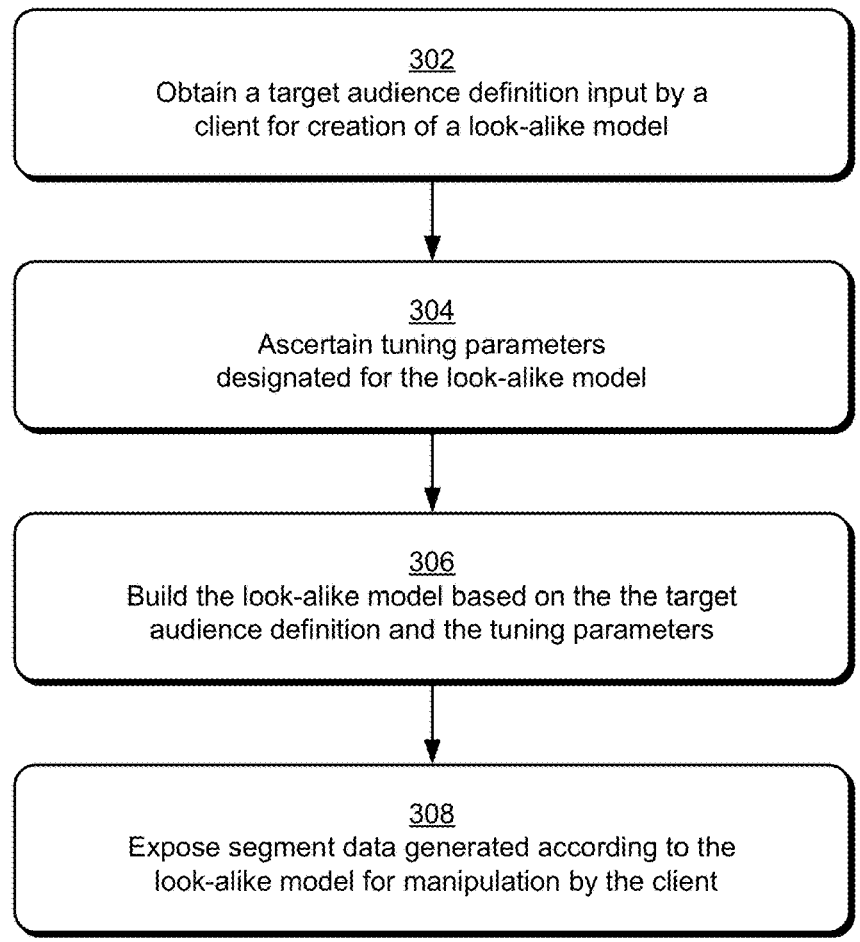
FIG. 3 is a flow diagram depicting an example procedure to generate tunable algorithmic segments.

FIG. 3 is a flow diagram depicting a procedure 300 in which a look-alike model is built. A target audience definition is obtained that is input by a client for creation of a look-alike model (block 302). For example, a digital marketer may interact with a marketing service 118 to specify a target audience definition 204. As previously described, the target audience definition 204 may indicate traits (e.g., characteristics and behaviors) for a known, baseline group of individuals (e.g., the target segment). A target audience definition 204 to initiate a look-alike analysis may be input in any suitable way. One way this may occur is through user interfaces 120 exposed by the marketing service 118. Through such interfaces, a marketer may be presented lists from which the marketer may select an existing segment and/or existing traits to use as a basis for look-alike analysis. In addition or alternatively, a form with various controls and fields operable to input the target audience definition may be exposed. Various other techniques are also contemplated, examples of which are discussed below in relation to example user interfaces.

Tuning parameters are ascertained that are designated for the look-alike model (block 304). Then, the look-alike model is built based upon the target audience definition and the tuning parameters (block 306). As mentioned the tuning parameters 206 enable the digital marketer (or other client) to control the model and segments that are generated. In some scenarios, tuning parameters 206 may be specified as part of the target audience definition 204. Default parameters may also be specified in advanced by a developer or configured by a client in a set-up phase. If tuning parameters 206 are not specified initially, the default parameters may be applied. Thereafter, the tuning parameters may be adjusted to cause a corresponding change in the segment data 208 for a model and/or the look-alike segments that are generated. Thus, the same model may be used to selectively generate different look-alike segments. Such selective creation of segments may be based on campaign goals such as a reach goal, accuracy goal, a reach-accuracy trade-off, and so forth.

Segment data generated according to the look-alike model is exposed for manipulation by the client (block 308). Here, a selected segmentation algorithm 202 may applied to generate segment data 208 according to the model. The look-alike model incorporates the target audience definition and tuning parameters such as a time period for analysis, selected data sources, a specified algorithm, reach-accuracy settings, a designated model run frequency, and so forth. The marketing service 118 may be configured to save the model in association with the client/marketer. The marketing service 118 may then automatically run the model at the specified frequency and output the resultant segment data for use by the client/marketer.

In an implementation, segment data 208 and/or a notification that segment data has been generated may be communicated to the client using various messaging techniques including but not limited to email, instant messaging, voicemail, and so forth. The segment data 208 may be supplied in the form of a report that may include lists of individuals, graphic representations of the model, links to access the data/model online, and/or other relevant information. In addition or alternatively, the marketing service 118 may provide links and/or online access to the model and segment data 208 for manipulation by the client. For example, the client may access the marketing service 118 from a browser 116 or client marketing module 114 and log into an account. The client may then be provided access to view the model and corresponding segment data 208, make changes to the tuning parameters 206, modify settings for the model, run the model on demand, select a different algorithm, change data sources, and otherwise interact with the look-alike model and corresponding segment data. Additional details regarding interactions with a look-alike model to modify segment data are described in relation to the following example procedure.

Figure 4:
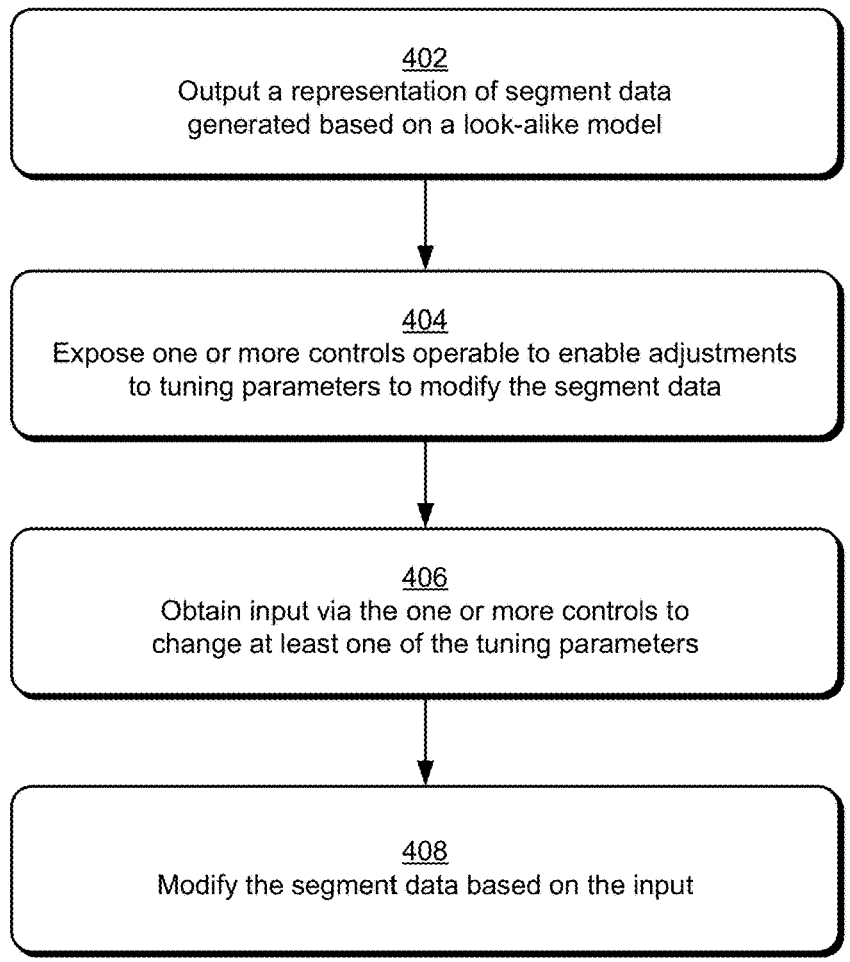
FIG. 4 is a flow diagram depicting an example procedure to modify segment data for a look-alike model in one or more implementations.

FIG. 4 is a flow diagram depicting a procedure 400 in which segment data is modified based on input obtained via one or more tuning parameter controls. A representation of segment data is output that is generated based on a look-alike model (block 402). For example, one or more user interfaces 120 (e.g., web pages or web accessible pages for a client application) may be output to enable various interactions with a look-alike model and corresponding segment data as described above. In addition or alternatively, the segment data 208 may be provided by way of one or more reports that may be generated automatically or on demand via the marketing service 118. The representation may include an indication of tuning parameters used to build the look-alike model. The representation may also show or provide access to segment data 208 including scoring data for different individuals; groups and/or list of individuals assigned into different segments; an indication of traits and/or a baseline segment used to produce the segment data 208; and so forth. Further, the representation may include various graphical representations of the segment data 208 one example of which is a reach versus accuracy chart as described in further detail in the example user interface section below.

One or more controls are exposed that are operable to enable adjustments to tuning parameters to modify the segment data (block 404). Various different controls are contemplated. For example, input boxes may be provided to directly input tuning parameter values such as a reach goal or an accuracy goal for the model. In addition or alternatively, radio controls may be provided to set values for reach-accuracy, select a segmentation algorithm, designate a time period for analysis, choose data sources, and so forth. Another example is a slider control. For example, a slider control may be exposed that is operable to set an accuracy goal and/or set a balance between reach and accuracy. A variety of other controls suitable to adjust tuning parameters 206 and cause corresponding changes in segment data 208 are also contemplated.

Input is obtained via the one or more controls to change at least one of the tuning parameters (block 406) and the segment data is modified based on the input (block 408). By way of example, assume that the look-alike model is initially run with a reach goal of 500,000 individuals. The segmentation algorithm 202 may be applied based on this reach goal to return segment data 208 that places at least 500,000 individuals in the look-alike segment. Now, if the reach goal is adjusted to 250,000 individuals, the next time the segmentation algorithm is run, the reach-accuracy balance is adjusted in favor of accuracy at the expense of reach. Accordingly, the run of the segmentation algorithm 202 may now return segmentation data 208 with fewer individuals placed into the look-alike segment but with a relatively higher degree of accuracy. This is but one illustrative example of how the ability to change tuning parameters enables a marketer to exert control over look-alike analysis and produce different look-alike segments to meet particular goals and/or model different scenarios.

Segmentation Algorithms

In the context of the forgoing example environment and procedures, consider now a discussion of some example segmentation algorithms that may be employed in at least some implementations. Generally speaking, a suitable segmentation algorithm is configured to score individuals in a general audience relative to a target audience definition. Individuals may be selected for inclusion in the matching, look-alike segment to populate the segment based on scoring criteria reflected by the segmentation algorithm and/or tuning parameters employed for the analysis. For example, a designated number of individuals that score the highest relative to the model may be assigned to the look-alike segment on a fixed number basis (e.g., top 100,000 scorers) or a percentage basis (e.g., top five percent).

In another approach, a threshold score may be employed to determine how to segment the general audience. In this approach, individuals that achieve the threshold score may be placed into the look-alike segment whereas those individuals that do not meet the threshold score are not assigned to the look-alike segment. Scoring criteria such as the examples just noted may be based on the tuning parameters, such as a designated reach versus accuracy setting (e.g., reach goal, accuracy goal, reach/accuracy balance, etc.) or other designated goal.

In some implementations, the score is derived as a weighted combination of traits selected for a model. Traits may be weighted in various ways using different weight factors, tuning parameters, and algorithms. To further illustrate, consider the following discussion of two example segmentation algorithms that may be used in one or more implementations. It should be noted that the enumerated examples are representative of the general features of suitable segmentation algorithms described herein and various other segmentation algorithms are also contemplated.

Example Algorithm 1—Ranking Algorithm

As mentioned in relation to FIG. 2, the inputs to the segmentation algorithm 202 include the audience data 126, the target audience definition 206 that specifies the target segment and traits to use for the analysis, and tuning parameters 206 used to selectively control and adjust the manner in which the segmentation algorithm 202 operates. As also mentioned, tuning parameters 206 may specify the particular algorithm to be applied, a reach-accuracy parameter or goal, a time frame for the analysis (e.g., last 30 days, two weeks, etc.), and so forth.

Using the above mentioned inputs, the first example algorithm computes scores for each individual (e.g., user/client/visitor) based at least in part upon a relative importance (e.g., weights) assigned to traits included in the target audience definition, e.g., the target segment that is going to be expanded through look-alike modeling. The relative importance may be determined based upon ratios with which traits occur in the target segment and the general audience, as explained below. In effect, the traits are ranked one to another to derive weight factors for each trait.

In particular, for the segment or trait(s) to expand (e.g., the target segment), the algorithm computes or otherwise obtains the following:

Traits[ ] //unique traits associated with individuals in the target segment
$T_{in}$ //total number of unique traits in the target segment
$T_{all}$ //total number of unique traits in the general audience per audience data
$N_{in}$ //total number of unique individuals in the target segment
$N_{all}$ //total number of unique individuals in the general audience per audience data In addition, for each trait in Traits[ ] the algorithm computes or otherwise obtains the following:

$n_{in}$ //total number of individuals in the target segment having the trait
$n_{all}$ //total number of individuals in audience data having the trait
$R_{in}$=SortedRank($n_{in}/N_{in}$)/$T_{in}$ //trait importance or ranking within target segment (normalized rank [0,1])
$R_{all}$ SortedRank($n_{all}/N_{all}$)/$T_{all}$ //trait importance or ranking per the audience data (normalized rank [0,1]).

Now, weights based on the normalized trait rankings may be computed as follows:

$S_c$=($R_{all}$−$R_{in}$)/$R_{in}$ //trait relative importance (magnitude, popularity)
$W_i$=$S_c$/Sum($S_c$) //weight factor for trait based on trait ranks.

Scores may then be computed using the $W_i$ values. The scores may be computed for each individual in the general audience that is not already included in the target segment as follows:

Trait existence is defined as:
$t_i$=[0,1] //1 indicates the user possesses this trait, 0 indicates the user does not possess this trait.

The score for each individual is determined by the following equation:

$$U_s=\text{Sum}(W_i*t_i)$$

In this manner, each individual user may be associated with a score. The scores may be output as segment data 208 as previously discussed. That is, the segment data 208 may indicate a list of unique user identities that are associated with respective scores ($U_s$). Reach versus accuracy data points and/or graphical representations may be generated according to the segment data 208. Moreover, the scores may be used as a basis to form look-alike segments according to default settings and/or based on tuning parameters 208 configured by the client/marketer. For instance, if a particular reach goal such as 250,000 new users is specified, the target segment may be expanded by ascertaining and adding the first 250,000 users associated with the highest respective scores ($U_s$).

Likewise, if a particular accuracy goal such as 0.5 is specified, then a different number of users, who satisfy the 0.5 accuracy goal may be returned for addition to the target segment. It should be noted again that accuracy indicates how similar of a match exists between the look-alike individuals and the target segment traits. An accuracy of 1 indicates a perfect matching of traits. At an accuracy of 0, all users in the general audience would be included in the computed segment and the algorithm would not be considered selective. If the scores $U_s$ are normalized to a scale from 0 to 1, then the accuracy goal represents a threshold score that individuals achieve to be added to the look-alike segment. In other words, with an accuracy goal set at 0.5, individuals with normalized scores between 0.5 and 1.0 are selected for addition to the target segment.

Example Algorithm 2—TF-IDF Style Algorithm

The second example segmentation algorithm is a variation of the example just described in which trait weights are based on frequency of occurrence. This approach is akin to term frequency-inverse document frequency (TF-IDF) analysis applied to determine relative importance of terms in a document, such as for cataloging, keyword generation, data mining and so forth. Here, the frequency of traits within the target audience relative to the frequency of the traits in the broader, general audience (e.g., audience data) is leveraged to derive weight factors for traits used for scoring individuals.

Again, for the segment or trait(s) to expand (e.g., the target segment), the algorithm computes or otherwise obtains data indicative of Traits[ ], $T_{in}$, $T_{all}$, $N_{in}$ and $N_{all}$. Likewise for each trait in Traits[ ] the algorithm also computes or otherwise obtains $n_{in}$ and $n_{all}$. These values are defined in the same ways as discussed in relation to the foregoing example algorithm.

Now for this variation, rather than using rankings as before, frequency factors are computed for each trait as follows:

TF=% users$_{in}$ having the trait/% users$_{all}$ having the trait= (n$_{in}$/N$_{in}$)/(n$_{all}$/N$_{all}$) //this factor represents the trait frequency IDF=log(N$_{all}$/n$_{all}$) //this factor represents the frequency of the trait within all the database (e.g., audience data).

Now, weights based on the frequency factors may be computed as follows:

S=TF*IDF //relative frequency scores for traits.

W$_i$=S$_c$/Sum(S$_c$) //weight factors based on trait frequency scores. Note: to simplify the computation a limit may be placed on the number of traits. For example, a maximum of 1000 traits may be set. This level may be set to provide adequate results without overburdening the system.

Similar to the first example algorithm, scores may be computed for individuals in the general audience using the W$_i$ values as follows:

Trait existence is again defined as:

t$_i$=[0,1] //1 indicates the user possesses this trait, 0 indicates the user does not possess this trait.

The score for each individual is determined by the following equation:

$$U_s = \text{Sum}(W_i^2 * t_i)$$

Scores computed in accordance with the second example segmentation algorithm may be output as segment data 208 and may be used as a basis to form look-alike segments based on the scores in the manner previously described.

The algorithms just discussed are provided as illustrative examples. Various other algorithms, weights, and scoring techniques may be employed without departing from the spirit and scope of the described techniques.

Example User Interfaces

Consider now a discussion of some example user interfaces that may be employed to implement aspects of the techniques for tunable algorithmic segments described herein. The example user interfaces of FIGS. 5-9 may be provided by a service provider 106 in conjunction with a marketing service 118. UIs may be arranged in various ways and configured with a variety of functionality/instrumentalities (e.g., buttons, links, menus, input boxes, tabs, icons, lists, graphical representations, selectable controls, etc.) to facilitate interaction with a suite of digital marketing tools provided by a marketing service 118. A client device 102 may access the user interface 120 over a network 108 and render corresponding user interfaces 120' for output at the client. This may occur through a standalone marketing module 114, via a browser 116, or otherwise. The user interfaces 120' may represent a combination of an application UI (e.g., a browser frame, app window, or other UI) and pages/content for interaction with the marketing service 118 displayable via the application UI.

Figure 5:
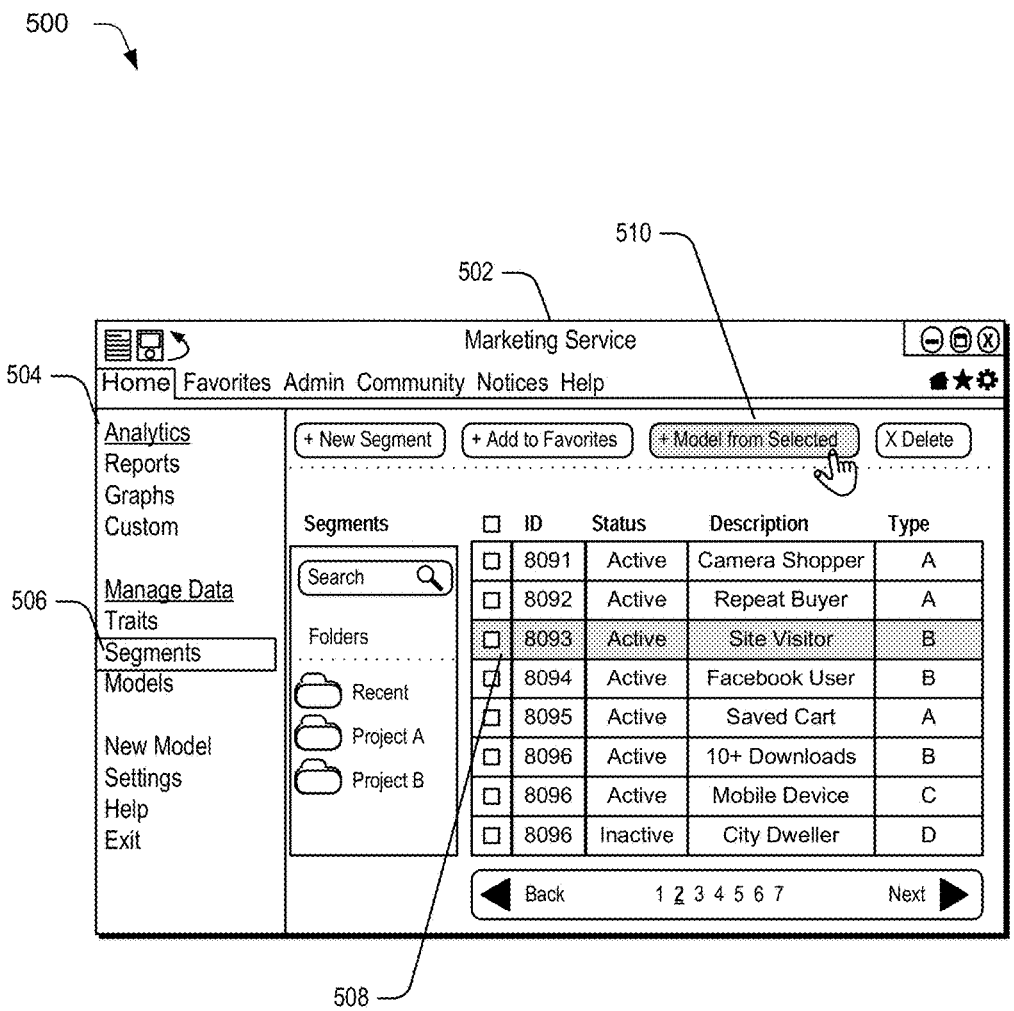
FIG. 5 is a diagram depicting an example user interface for interaction with segments in accordance with one or more implementations.

FIG. 5 depicts generally at 500 an example user interface 502 that enables various interactions with a service provider 106. In this example, the user interface is depicted as an interface for a browser 116 that presents a web page from the marketing service 118. Other implementations are also contemplated, such as user interfaces associated with a stand-alone marketing module 114. In the depicted example, the user interface 502 enables a client/marketer to access an account with a service provider 106 and interact with corresponding data. This includes access to create and manage marketing campaigns, manipulate audience data, produce reports, interact with segments, distribute offers, and so forth.

Here, the user interface 502 includes a menu list 504 that provides different available options to take advantage of digital marketing tools provided via the marketing service. For instance, an analytics menu may be configured with functionality to produce reports, graphs, and/or custom analysis of audience data. A manage data menu may also be provided to enable definition and management of traits, segments, and models. Other options and instrumentalities are also contemplated, such as options to access a new model dialog, a help menu, a settings page, and so forth.

In this example, a segments option 506 is illustrated as being selected. The segments option 506 enables a user to navigate existing segments, create new segments, view/modify segments, and so forth. Accordingly, a list of available segments 508 may be retrieved and displayed responsive to selection of the segments option 506. The page including the list of available segments 508 is configured to facilitate navigation of different available segments. Options provided within the page may include search functionality to enable searching of databases and folders to locate segments, controls to create or delete segments, list navigation controls, and so forth. Comparable pages to navigate traits and models may also be provided responsive to selection of corresponding options from the menu list 504 or operation of another suitable user interface instrumentality.

As mentioned, a segment corresponds to a group of individuals having traits designated for the segment. Each segment may be defined on the basis of one or multiple selected traits. Different segments are associated with different lists/groups of user identities that the digital marketer may employ to selectively provide offers for products, services, and content to individuals in a targeted manner. Some example segments represented in the list of FIG. 5 include a camera shopper segment, a repeat buyer segment, and a mobile device user segment, to name a few. These different segments may be employed in connection with marketing campaigns to increase the chances that offers are distributed to individuals who are likely to appreciate the offer and/or take action in response to the offer (e.g., visit a site, buy a product, sign-up for a service, etc.). Segments may be derived in various ways including through application of the tunable algorithmic segment techniques described above and below.

As represented in FIG. 5, the example user interface 502 also includes a create model from selected option 510 that facilitates creation of a look-alike model using an existing segment. In this case, a site visitor segment is illustrated as being selected within the list of available segments 508. Operation of the create model from selected option 510 with the site visitor segment selected initiates creation of a model using the selected segment as the target segment for look-alike analysis. In at least some implementations, operation of the create model from selected option 510 may cause navigation to another user interface/page configured with model builder functionality to define a look-alike model based on the selected segment. It should be noted, that a comparable process may be provided to select one or more traits defined by the system through a trait navigation interface(s) and initiate creation of a model based on the selected traits via a corresponding control.

Figure 6:
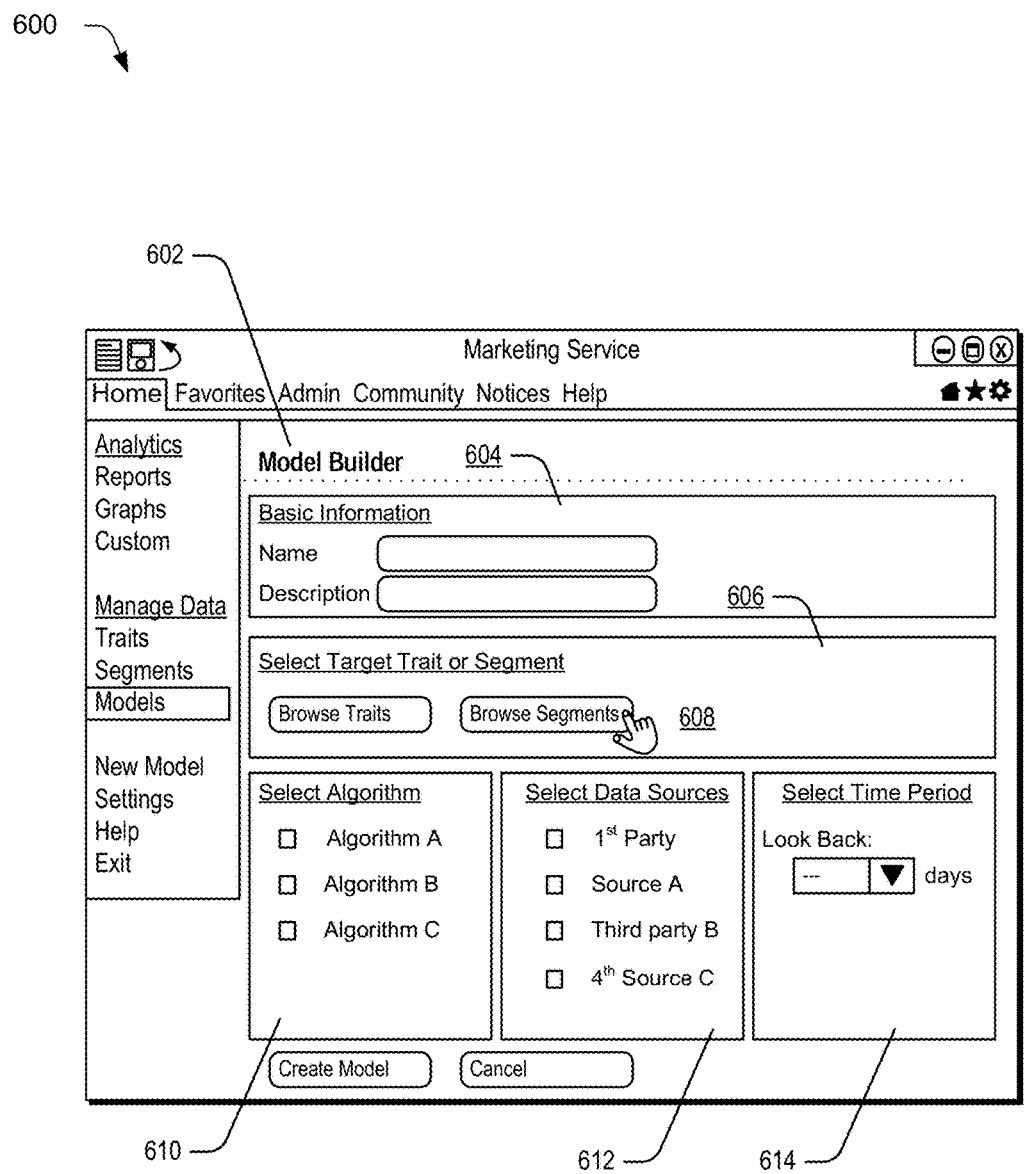
FIG. 6 is a diagram depicting an example user interface for defining a look-alike model in accordance with one or more implementations.

FIG. 6 depicts generally at 600 an example user interface 602 that is representative of a model builder page to facilitate model creation. The example model builder page may be output responsive to selection of a create model control as just described, a selection from the menu list 504, or otherwise. The model builder page provides functionality to input information and make selections to define a model. A basic information portion 604 may include fields for input of basic data regarding the model, such as a name and description. Additional examples of basic data that may be collected include permissions, keywords, and model categorization data to facilitate indexing, searching, and management of the model.

Additionally, the model builder page includes a select target portion 606 configured to facilitate selection of existing traits or segments to use as a baseline for the model. A target audience definition 204 may be produced for the model based upon selections that are made via the select target portion 608. If the model builder page is accessed via a create from selected segment or trait control, then the select target portion 606 may be populated with data regarding the selected segment or traits. In addition or alternatively, controls operable to navigate/browse traits and segments may be exposed as depicted in FIG. 6. For instance, selection of the browse segments button 608 may cause output of and/or navigation to another page, tab, or pop-up window that incorporates functionality to browse and selected segments. In particular, a page comparable to the example user interface 502 of FIG. 5 may be output in response to operation of the browse segments button 608 as a separate page, in a new tab, as a pop-up/overlay, or otherwise. Navigation to select traits via a browse traits control may occur in a like manner. Responsive to selection of a segment or trait(s) in this way, the focus may be returned to the model builder page.

The model builder page further provides functionality to set various tuning parameters 206 for the model. By way of example and not limitation, the user interface 602 is depicted as including an algorithm selection option 610, a data source selection option 612, and a time period selection option 614. Options to set or modify other tuning parameters, such as reach/accuracy goals and/or an interval for execution of the model may also be provided in some implementations.

Figure 7:
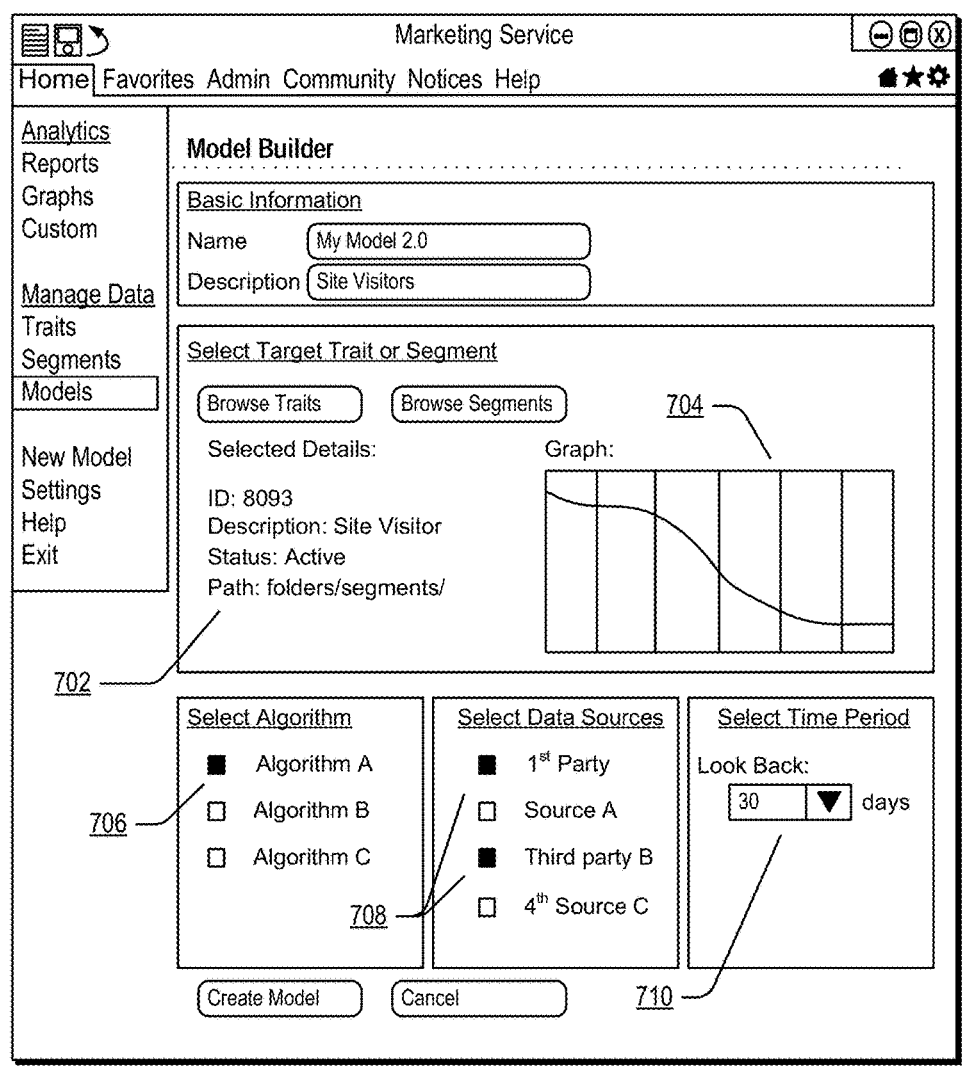
FIG. 7 is a diagram depicting an example user interface for showing selections to define a look-alike model in accordance with one or more implementations.

FIG. 7 depicts generally at 700 an example of the user interface 602 of FIG. 6 following selections made to define the model. Here, a site visitor segment has been selected as a basis for the model. Accordingly target details 702 are shown for the selected segment. In some cases, the target details 702 may include a graphical representation of the segment 704, such as an initial reach versus accuracy graph for the target. Further, in some scenarios the graphical representation may include controls operable to set or modify tuning parameters for the model. In one particular example, a reach versus accuracy graph presented for a model may be operable to set reach or accuracy goals for the model. Further details of example reach accuracy graphs are described below in relation to FIG. 9.

FIG. 7 further represents a selection 706 of an algorithm "A" from available choices and a selection 708 of one or more data sources for available sources, which in this example include both first party data (e.g., the client/marketer's own data) and third-party data available from other providers and services. Individual data sources and combinations of two or more data sources may be selected. Further, a selection 710 of a time period for the look-alike analysis is depicted. Here, the time period is set to a thirty day look back and accordingly when the model is run, data from the selected data sources collected for the last thirty days will be analyzed for the model using the selected algorithm.

Figure 8:
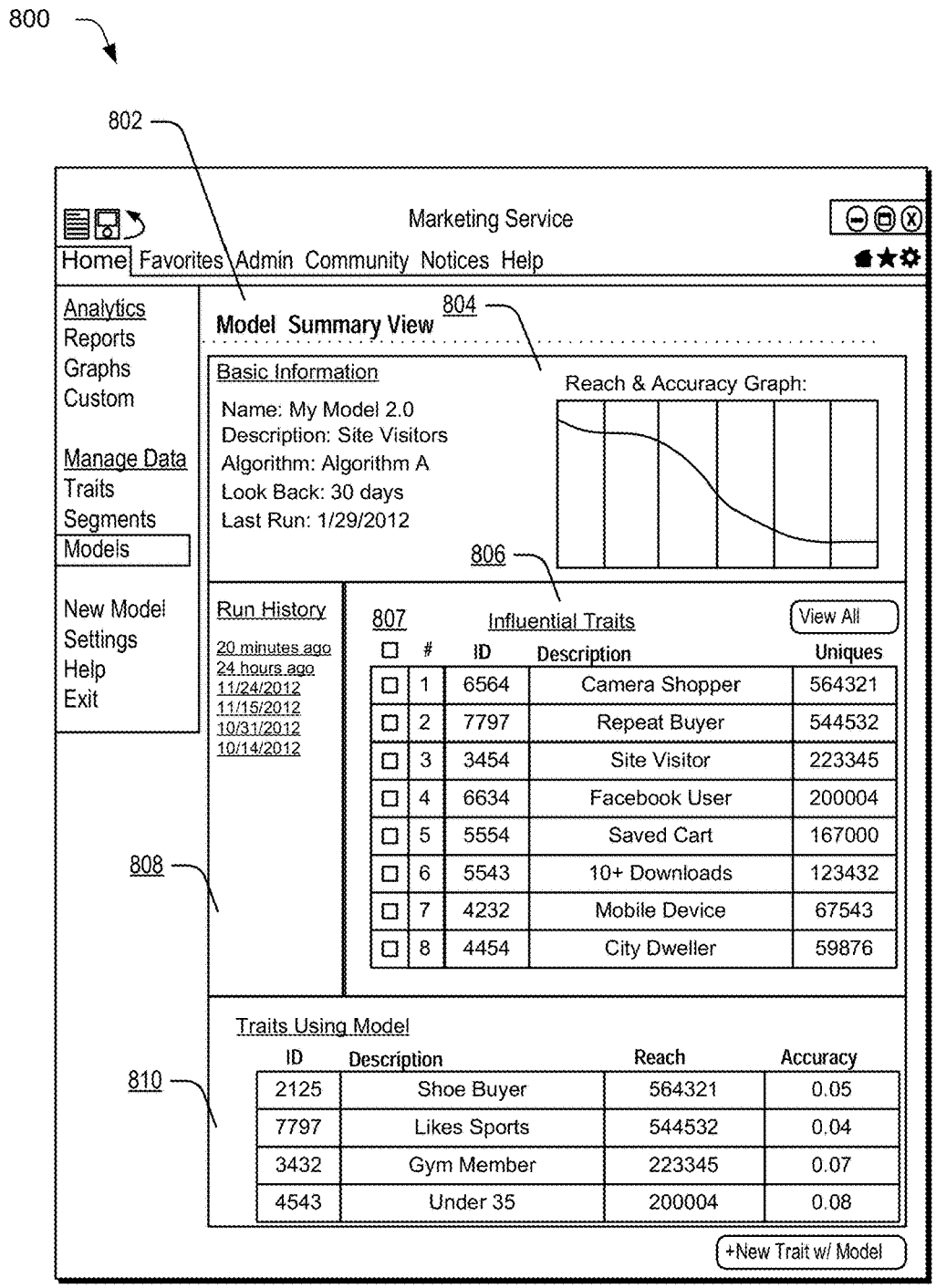
FIG. 8 is a diagram depicting an example user interface for interaction with a look-alike model in accordance with one or more implementations.

FIG. 8 depicts generally at 800 an example of a user interface 802 that is representative of a model summary view. The example model summary view may be generated for an existing look-alike model responsive to execution of the model, on demand, as a report that may be distributed to the client/marketer, or otherwise. In some implementations, a client may be notified when the model is run using email or other suitable messaging techniques. A report having the model summary view may be included in the notification and/or a link to access the model summary view from the marketing service 118 may be provided as part of the notification.

The model summary view may be configured in various ways to provide information regarding and interaction with a corresponding look-alike model. For example, a basic information portion 804 may provide details regarding the model such as a name, description, tuning parameters, and so forth. In the depicted example, the basic information portion also includes a reach versus accuracy graph as described herein. In some implementations, the reach versus accuracy graph may be selectable to expand the graph and/or open a new page for interaction with the graph. This interaction may include reviewing reach/accuracy data as well as making changes to tuning parameters for reach and accuracy to adjust the model. An example interface for adjustment of reach/accuracy is depicted and described in relation to FIG. 9 below.

The example model summary view is further depicted as having a top model traits list 806, a processing history portion 808, and a traits using model portion 810 configured to provide further information with respect to aspects of the model. In particular, the top model traits list 806 is configured to display selected traits within the model that may have the great impact on the model (e.g., the most influential traits). This portion also shows the number of unique individuals identified as having the listed traits and may rank the traits in the list accordingly. An option selectable to view more traits or all traits for the model may also be provided.

In addition, the top model traits list 806 may include a check box column 807 that provides check boxes or other selectable controls associated with the listed traits. The check box column 807 is configured to enable selection and de-selection of the influential traits associated with the model that are listed. This provides the digital marketer (or other user) with further tunable control over the model by setting particular traits to be used for the model. Through selections of traits made via the check box column 807, the digital marketer is able to finely tune the model by choosing exactly which traits to use for subsequent model runs. Naturally, different traits may be selected for different runs to test and examine different scenarios. For instance, the digital marketer may have past experience, knowledge, and intuition regarding their audiences that may guide them to choose or remove particular traits or combination of traits returned by the analysis to tune the model. The check box column 807 provides a mechanism by which the digital marketer may inject their experience and intuition into the model to supplemental the algorithmic based number crunching power of the model.

The processing history portion 808 is configured to display details regarding the processing runs for the model. Individual runs may be listed along with date or time stamps for the runs. The listed runs may also be configured as links selectable to access details for a selected run. Further, the traits using model portion 810 is configured to display selected traits in the system that are built using the model. Reach and accuracy data for the listed traits may be provided in addition. This portion may also provide functionality to create a new trait that uses the model, such as via the example button shown in FIG. 8. Accordingly, the same model may be applied and reused to create different traits.

Tuning parameters, such as reach and accuracy goals and data sources may be set individually for the different traits. Thus, different traits may be defined for various scenarios to target different audience members.

Figure 9:
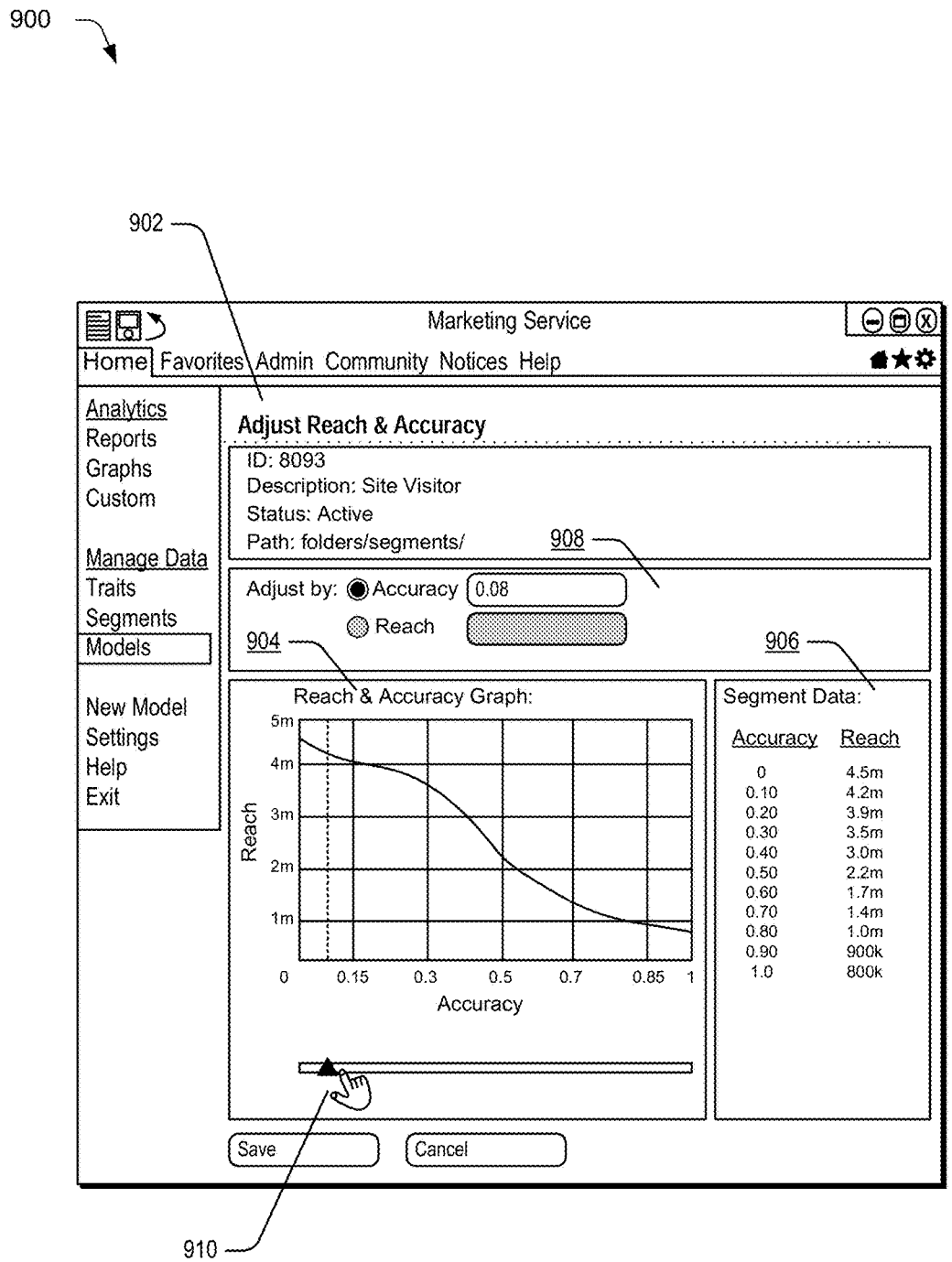
FIG. 9 is a diagram depicting an example user interface for adjustment of reach versus accuracy in accordance with one or more implementations.

FIG. 9 depicts generally at 900 an example of a user interface 902 that is representative of a page configured to adjust reach and accuracy for a model. The example user interface of FIG. 9 is configured to present a detail view of a reach versus accuracy graph 904 for a model. In addition, the underlying segment data generated for the model may be displayed in a data details portion 906. Selecting individual points from the data details portion 906 may cause a callout, animation, or other representation of the selected point to appear in the reach versus accuracy graph 904. Likewise, selection of points from the graph may cause corresponding points in the data details portion 906 to be emphasized by highlighting, changing text color, or otherwise.

In accordance with techniques described herein, the example user interface 902 may also include various controls operable to enable adjustments to tuning parameters for the model. Various controls or other instrumentalities may be provided to facilitate changes in tuning parameters and therefore cause corresponding modifications to segment data for the model. By way of example and not limitation, a radio control 908 is depicted that is configured to enable selection of a reach or accuracy goal for the model. Here, the radio control allows a client/marketer to select either adjustment by accuracy or adjustment by reach. In the particular example, accuracy is selected and a value of 0.08 is set for the accuracy. This selection is represented in the graph by the dashed line corresponding to the 0.08 accuracy goal. Adjustment by reach may be specified by selection of reach from the radio control and input of a reach goal. Responsive to changes in the selected values/goals, the graph may be updated to reflect the changes. Moreover, the new goal may be applied the next time the model is executed.

In addition or alternatively, other types of controls may be provided in conjunction with the reach versus accuracy graph 904, one example of which is the slider control 910 depicted in FIG. 9. Here, the example slider control 910 is operable by sliding left and right to select an accuracy goal along the horizontal axis of the graph. A comparable slider for adjustments of reach may be displayed along the vertical axis in addition or as an alternative to the accuracy slider control. Various other types of controls to make adjustment to these and other tuning parameters are also contemplated.

Having considered example user interfaces, consider now a discussion of an example system and components of the system that can be employed to implement embodiments of the techniques for tunable algorithmic segments described herein.

Example System and Device

Figure 10:
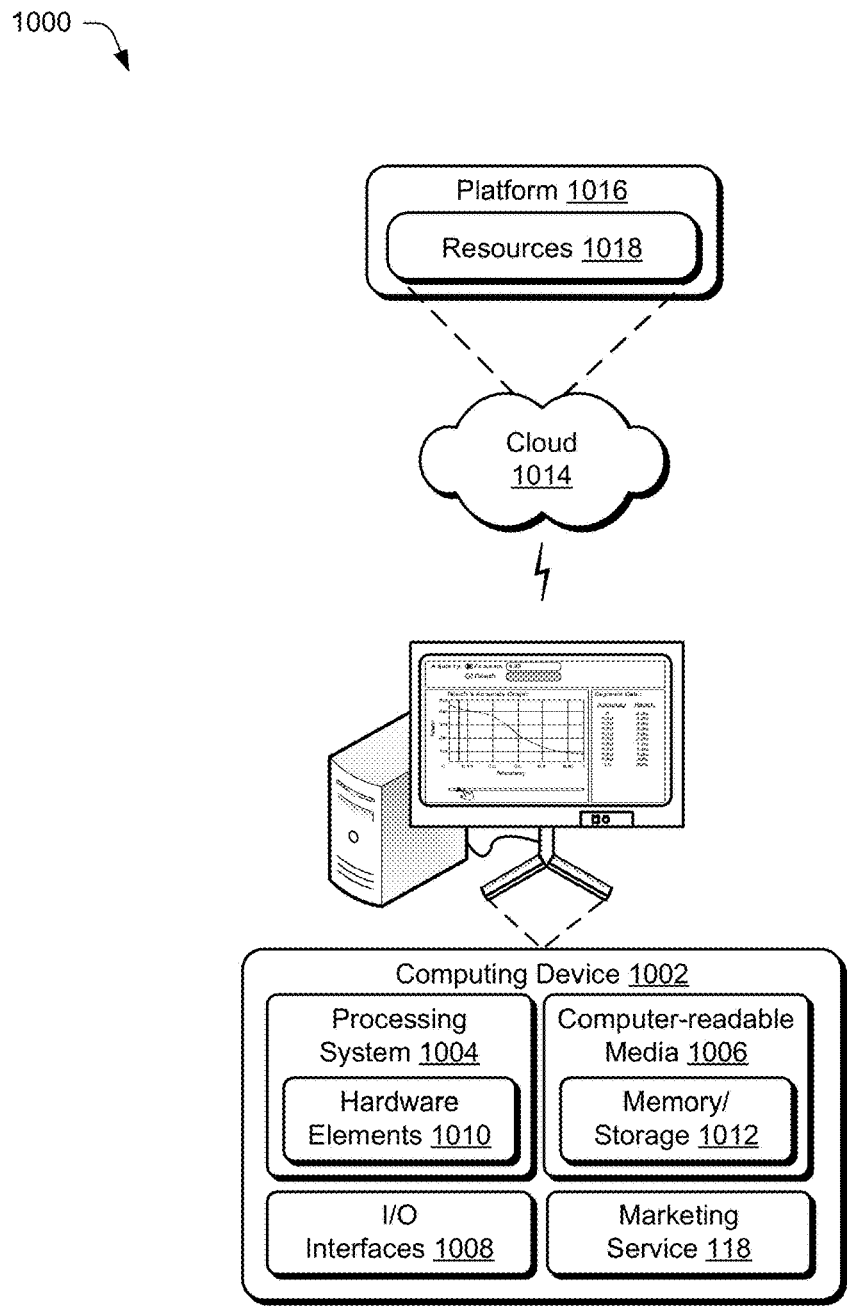
FIG. 10 illustrates an example system that can be employed to implement aspects of the techniques described herein.

FIG. 10 illustrates an example system generally at 1000 that includes an example computing device 1002 that is representative of one or more computing systems and/or devices that may implement the various techniques described herein. This is illustrated through inclusion of the marketing service 118, which may be configured to provide a suite of digital marketing tools to users of the service. Alternatively, the computing device may represent a client device that includes a marketing module 114 or browser 116 to implement aspects of the described techniques. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage media comprising instructions that, when executed by a computing device, implement a marketing service configured to perform operations comprising:
    generating, by a processor of the computing device, segment data based on analysis of audience data from one or more sources according to a look-alike model, the segment data indicative of individuals in the audience data that match traits of a target segment defined for the look-alike model, the generating including:
        obtaining a target audience definition that defines the traits of the target segment, the traits including characteristics and behaviors of individuals that have interacted with online resources in a designated manner;

ascertaining tuning parameters designated for the look-alike model including an indication of a selected segmentation algorithm;

determining a selection of the one or more sources of the audience data; and applying the selected segmentation algorithm to compute scores for the individuals in the audience data, the scores indicative of how closely the individuals in the audience data match the characteristics and behaviors of the individuals that have interacted with online resources in the designated manner in the target segment, the scores computed as a weighted combination of characteristics and behaviors possessed by individuals included in the audience data, the weighted combination of characteristics and behaviors indicated by the target audience definition;

outputting a user interface having a representation of the segment data;

exposing via the user interface one or more controls configured to enable adjustments to the tuning parameters associated with the look-alike model to modify the segment data, the one or more controls including a control configured to specify a reach goal or an accuracy goal for the analysis of the audience data according to the look-alike model;

obtaining input from a user corresponding to a desired value for the reach goal or the accuracy goal via the one or more controls in the user interface to change at least one of the tuning parameters; and modifying the representation of segment data in the user interface based on the input that is obtained by changing the at least one of the tuning parameters such that the representation of segment data corresponds to the reach goal or accuracy goal based on the desired value.

2. The one or more computer-readable storage media of claim 1, wherein the marketing service is further configured to perform operations including:

exposing the segment data for access by a client, including providing access to a list of user identities for the individuals in the audience data in association with corresponding scores computed for the individuals in the audience data.

3. The one or more computer-readable storage media of claim 1, wherein the representation includes a reach versus accuracy graph of the segment data.

4. The one or more computer-readable storage media of claim 1, wherein the values input by the user for the reach goal and the accuracy goal are configured to modify the audience data according to the look-alike model.

5. The one or more computer-readable storage media of claim 1, wherein the tuning parameters further comprise one or more of weight factors to control contribution of particular characteristics and behaviors of the individuals included in the audience data in the weighted combination, a time period indicative of an interval for processing audience data, data source selections, weights to control contribution of different data sources, addition of customized traits, removal of selected traits, segmentation algorithm selections, and model run frequency.

6. The one or more computer-readable storage media of claim 1, wherein the weighted combination of behaviors and characteristics possessed by individuals included in the audience data is determined using weight factors for the behaviors and characteristics that are derived based upon a ranking of the behaviors and characteristics one to another.

7. The one or more computer-readable storage media of claim 1, wherein the weighted combination of behaviors and characteristics possessed by individuals included in the audience data is determined using weight factors for the behaviors and characteristics that are derived based upon relative frequency with which the behaviors and characteristics occur in the target segment and the audience data.

8. A computing device comprising:

one or more modules implemented at least partially by hardware of the computing device, the one or more modules configured to perform operations including:

obtaining a target audience definition indicative of traits possessed by a target segment to use for analysis of audience data to discover a matching segment of individuals in a general audience possessing traits similar to the traits of the target segment, the traits of the target segment including characteristics and behaviors of individuals in the target segment that have interacted with online resources in a designated manner;

ascertaining tuning parameters designated for the analysis including at least:

an indication of a selected segmentation algorithm configured to compute scores for individuals in the general audience by a comparison of characteristics and behaviors of the individuals in the general audience to the characteristics and behaviors possessed by the target segment; and a parameter to designate a reach versus accuracy setting for the analysis;

applying, by a processor of the computing device, the selected segmentation algorithm to the audience data to compute the scores as a weighted combination of the characteristics and behaviors possessed by the individuals in the general audience using weight factors for the characteristics and behaviors of the target segment that are derived based upon a ranking of the traits characteristics and behaviors one to another;

forming the matching segment to achieve the designated reach versus accuracy setting based on the scores;

obtaining input from a user corresponding to a desired value for the reach goal or the accuracy goal via the one or more controls in a user interface to change at least one of the tuning parameters; and modifying a representation of the matching segment in the user interface based on the input that is obtained by changing the at least one of the tuning parameters such that the representation of the matching segment in the user interface corresponds to the reach goal or accuracy goal based on the desired value.

9. The computing device of claim 8, wherein the matching segment comprises an indication of user identities for individuals in the general audience having scores that satisfy the designated reach versus accuracy setting.

10. The computing device of claim 8, wherein the weight factors for the characteristics and behaviors of the target segment are further derived based upon relative frequency with which the characteristics and behaviors occur in the target segment and the audience data.

11. A method implemented by a computing device comprising:

generating, by a processor of the computing device, segment data based on analysis of audience data from one or more sources according to a look-alike model, the segment data indicative of individuals in the audience data that match traits of a target segment defined for the look-alike model, the generating including:
obtaining a target audience definition that defines traits of the target segment, the traits including characteristics and behaviors of individuals that have interacted with online resources in a designated manner;
ascertaining tuning parameters designated for the look-alike model including an indication of a selected segmentation algorithm;
determining a selection of the one or more sources of the audience data; and
applying the selected segmentation algorithm to compute scores for the individuals in the audience data, the scores indicative of how closely the individuals in the audience data match the characteristics and behaviors of the individuals that have interacted with the online resources in the designated manner in the target segment, the scores computed as a weighted combination of characteristics and behaviors possessed by individuals included in the audience data, the weighted combination of characteristics and behaviors indicated by the target audience definition;
outputting a user interface for a marketing service having a representation of the segment data;
exposing via the user interface controls configured to enable adjustments to the tuning parameters associated with the look-alike model to modify a representation of the segment data, the controls including:
a control configured to specify a reach goal or an accuracy goal for the analysis of the audience data according to the look-alike model; and
a control configured to specify a relative importance of the characteristics and behaviors to generate weights to be used in the weighted combination of characteristics and behaviors;
obtaining input from a user corresponding to a desired value for the reach goal or the accuracy goal via the controls in the user interface to change at least one of the tuning parameters; and
modifying the representation of segment data in the user interface based on the input that is obtained by changing the at least one of the tuning parameters such that the representation of segment data corresponds to the reach goal or accuracy goal based on the desired value.

12. The method of claim 11, further comprising exposing the segment data for access by a client, including providing access to a list of user identities for the individuals in association with corresponding scores computed for the individuals.

13. The method of claim 11, wherein the representation includes a reach versus accuracy graph of the segment data.

14. The method of claim 11, wherein the values input by the user for the reach goal and the accuracy goal are configured to modify the audience data according to the look-alike model.

15. The method of claim 11, further comprising:
identifying via the user interface a selection of one or more sources of audience data that describes characteristics of a general audience from among multiple available sources; and
generating the segment data by applying the look-alike model to audience data from the identified sources.

16. The method of claim 11, wherein the segmentation algorithm for the look-alike model is selected from among multiple available segmentation algorithms.

17. The method of claim 11, wherein exposing the segment data includes providing one or more options selectable by the client to modify the segment data by adjusting the tuning parameters and thereby produce different corresponding look-alike segments from the segment data.

18. The method of claim 11, further comprising:
identifying based on the segment data as modified a look-alike segment of individuals that match selected traits indicated by the target audience data; and
selectively delivering offers from a digital marketer to the individuals included within the look-alike segment.

19. The method of claim 11, wherein the weighted combination of characteristics and behaviors possessed by individuals included in the audience data is determined using weight factors that are derived:
based upon a ranking of the characteristics and behaviors one to another; or
based upon relative frequency with which the characteristics and behaviors occur in the target segment and the audience data.

* * * * *

UNITED STATES PATENT AND TRADEMARK OFFICE
CERTIFICATE OF CORRECTION

PATENT NO. : 10,373,197 B2
APPLICATION NO. : 13/726308
DATED : August 6, 2019
INVENTOR(S) : Nicholas M. Jordan et al.

It is certified that error appears in the above-identified patent and that said Letters Patent is hereby corrected as shown below:

In the Claims

Column 21, Line 39, after "via the", insert -- one or more --, therefor.

Signed and Sealed this
Eighth Day of October, 2019

Andrei Iancu
*Director of the United States Patent and Trademark Office*